(12) United States Patent
Mashue et al.

(10) Patent No.: US 9,677,538 B2
(45) Date of Patent: Jun. 13, 2017

(54) WIND TURBINE ROTOR BLADE ASSEMBLY WITH ROOT EXTENSION PANEL AND METHOD OF ASSEMBLY

(75) Inventors: Aaron John Mashue, Simpsonville, SC (US); Bruce Clark Busbey, Greer, SC (US); Christian A. Carroll, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1470 days.

(21) Appl. No.: 13/369,445

(22) Filed: Feb. 9, 2012

(65) Prior Publication Data

US 2013/0209264 A1    Aug. 15, 2013

(51) Int. Cl.
*B29C 71/00* (2006.01)
*F03D 1/06* (2006.01)

(52) U.S. Cl.
CPC ........ *F03D 1/0683* (2013.01); *F05B 2230/80* (2013.01); *Y02E 10/721* (2013.01); *Y02P 70/523* (2015.11)

(58) Field of Classification Search
CPC .... F03D 1/0683; F03D 1/0641; F03D 1/0675; F05B 2230/80; B29C 70/78; B29C 70/74; Y10T 29/49336; Y10T 29/49337; Y10T 29/4998; Y02E 10/721
See application file for complete search history.

(56) References Cited

U.S. PATENT DOCUMENTS

| | | | |
|---|---|---|---|
| 7,604,461 B2 | 10/2009 | Bonnet | |
| 8,047,784 B2 | 11/2011 | Bonnet | |
| 2008/0166235 A1 | 7/2008 | Standish et al. | |
| 2009/0196756 A1* | 8/2009 | Althoff | F03D 1/0675 416/226 |
| 2010/0028161 A1 | 2/2010 | Vronsky et al. | |
| 2010/0028162 A1* | 2/2010 | Vronsky | F03D 1/0641 416/241 R |
| 2010/0122459 A1* | 5/2010 | Suffield | B29C 41/04 29/889.7 |
| 2010/0135814 A1* | 6/2010 | Bakhuis | F03D 1/0633 416/223 R |
| 2010/0143146 A1 | 6/2010 | Bell et al. | |
| 2011/0221093 A1* | 9/2011 | Perrow | B29C 70/44 264/255 |
| 2011/0243750 A1* | 10/2011 | Gruhn | B29B 11/16 416/226 |

* cited by examiner

*Primary Examiner* — Gregory Anderson
*Assistant Examiner* — Maxime Adjagbe
(74) *Attorney, Agent, or Firm* — Dority & Manning, P.A.

(57) ABSTRACT

A wind turbine rotor blade assembly and associated method include a rotor blade having a pressure side, a suction side, a leading edge, and a trailing edge extending in a generally span-wise direction between a tip and a root. An edge extension panel is attached along either of the leading edge or trailing edge (or along both edges) in a generally span-wise direction from adjacent the root towards the tip. The edge extension panels include a cured and hardened viscous material continuous core formed onto the leading or trailing edge with a contoured generally aerodynamic outer surface.

7 Claims, 5 Drawing Sheets

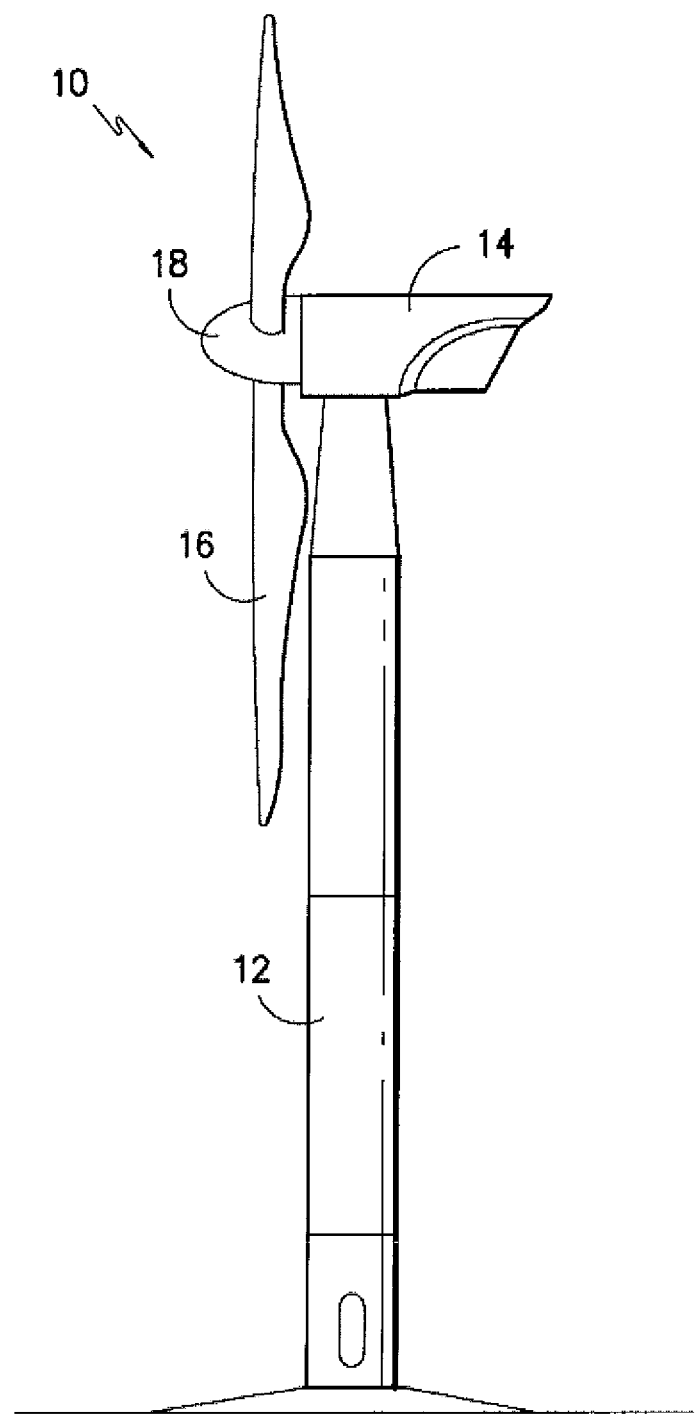
Fig. -1-
Prior Art

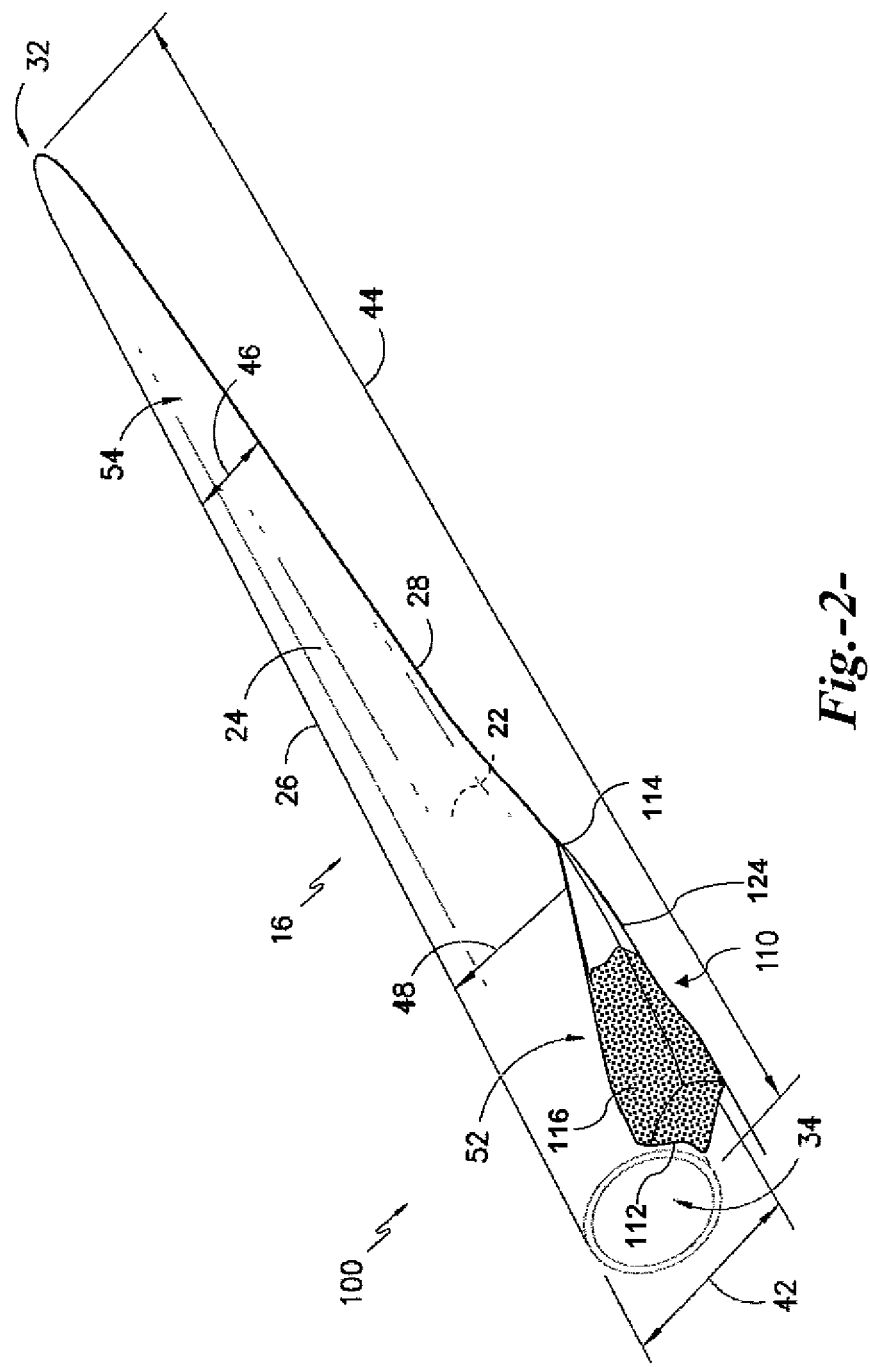
Fig.-2-

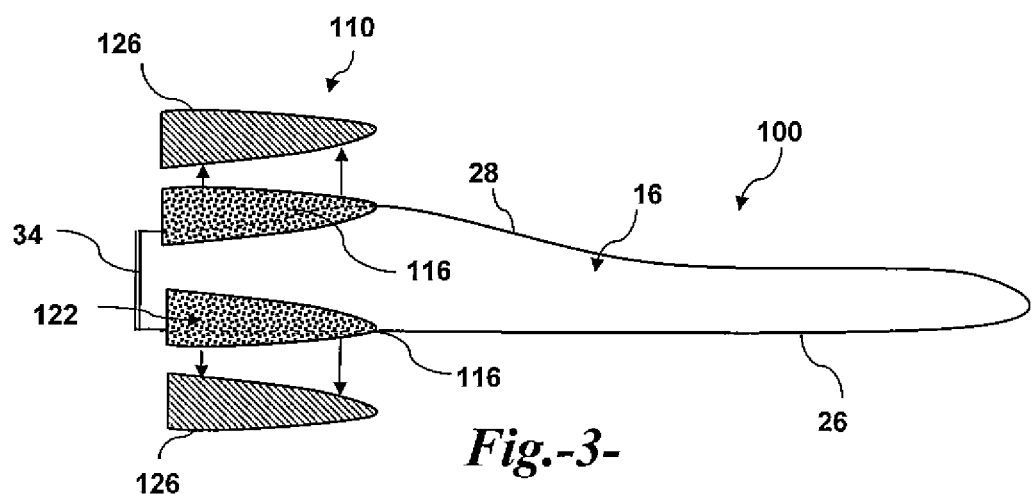
*Fig.-3-*
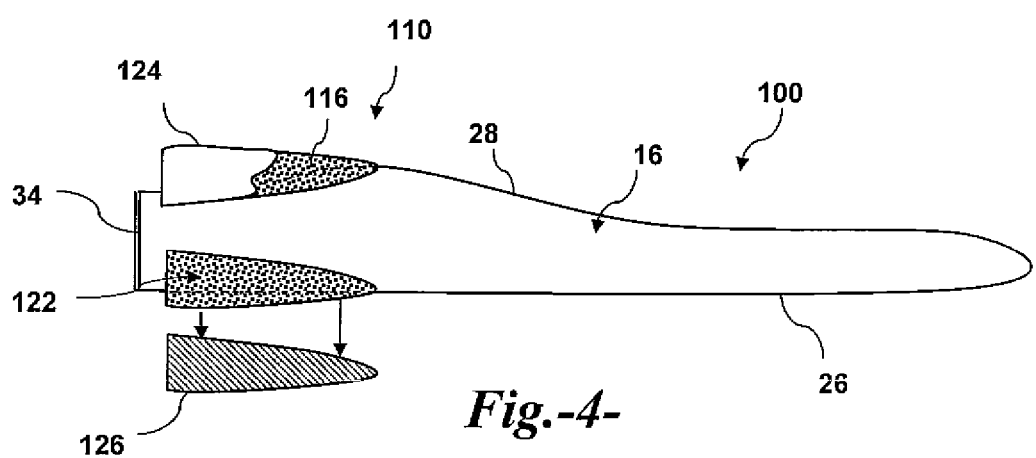
*Fig.-4-*

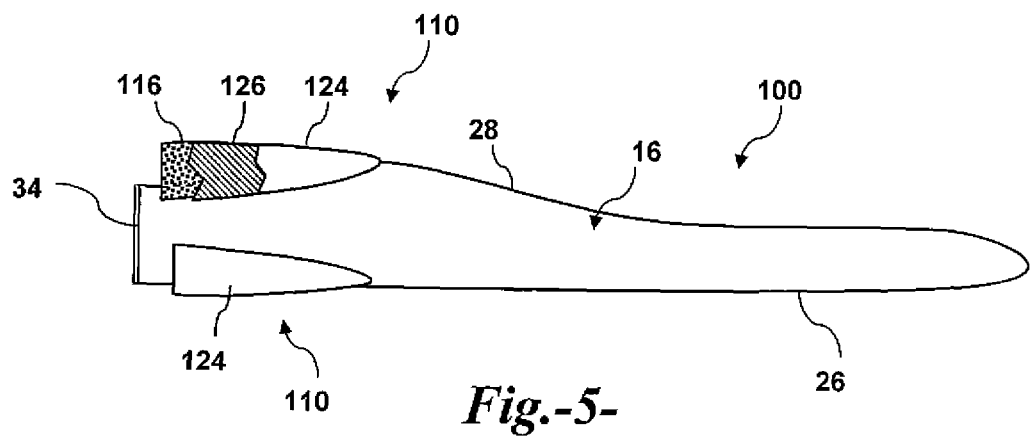
Fig.-5-
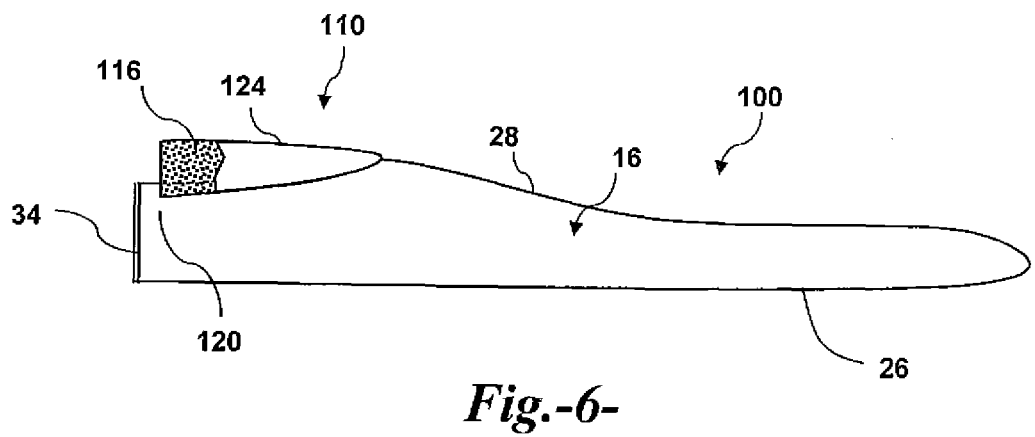
Fig.-6-
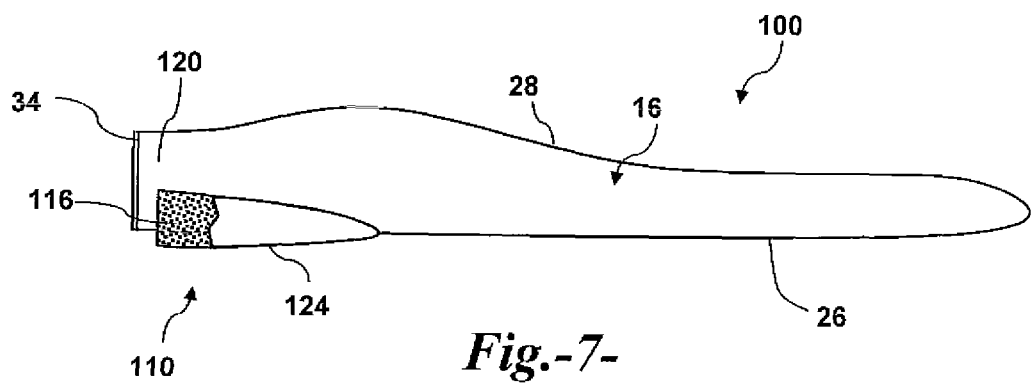
Fig.-7-

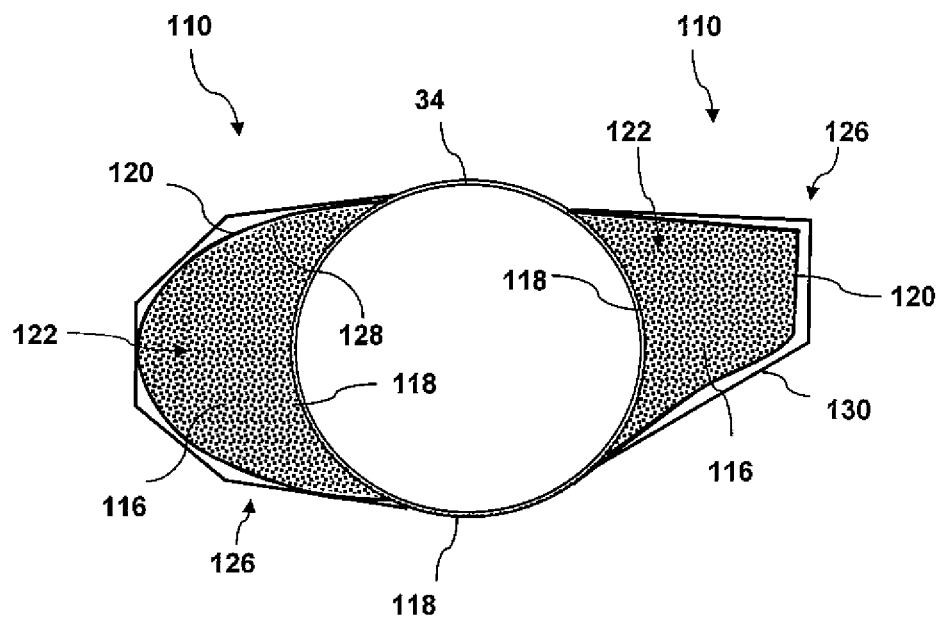
*Fig.-8-*
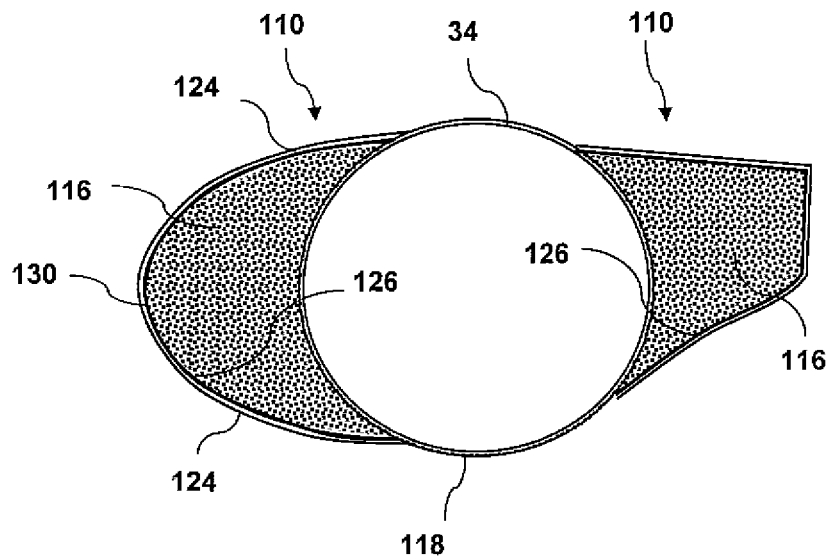
*Fig.-9-*

WIND TURBINE ROTOR BLADE ASSEMBLY WITH ROOT EXTENSION PANEL AND METHOD OF ASSEMBLY

FIELD OF THE INVENTION

The present disclosure relates in general to wind turbine rotor blades, and more particularly to an extension panel for assembly to a root portion of a wind turbine blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Rotor blades in general are increasing in size, in order to become capable of capturing increased kinetic energy. However, the shape of a typical wind turbine rotor blade results in a relatively large aerodynamic separation region, due to the contour of the rotor blade. Specifically, the contour of the inner portion of the rotor blade adjacent to and including the cylindrical root causes such separation. In some cases, this inner portion may include 40%, 50% or more of the rotor blade. The separation region causes relatively significant energy losses by creating drag. Further, these losses are amplified as rotor blade sizes are increased.

Add-on extensions or other structures have been suggested for improving the aerodynamic profile of the inner portion of the rotor blade. Reference is made, for example, to U.S. Pat. No. 7,837,442. An issue, however, exists in effectively incorporating these structures at the cylindrical root portion of the blade without increasing the overall size and, thus, logistical costs and issues associated with transporting the blades to the wind turbine site.

Thus, an improved assembly that more effectively utilizes the benefits of a root-end leading or trailing edge extension panel without significantly increasing the shipping burden and costs associated with the blade would be desired.

BRIEF DESCRIPTION OF THE INVENTION

Aspects and advantages of the invention will be set forth in part in the following description, or may be obvious from the description, or may be learned through practice of the invention.

In one embodiment, a wind turbine rotor blade assembly is provided, and includes a rotor blade having a pressure side, a suction side, a leading edge, and a trailing edge extending in a generally span-wise direction between a blade tip portion and a root portion. An edge extension panel is attached along either of the leading edge or trailing edge in a generally span-wise direction from adjacent the root towards the tip. The edge extension panel includes a core formed from a cured and hardened viscous material. The core is formed directly onto the leading or trailing edge with a contoured generally aerodynamic outer surface.

The core may be formed from any number of suitable materials that can be injected into a mold in a viscous or flowable state, such as a resin, epoxy, and the like. In a particular embodiment, the core is formed from a cured and hardened foam material, wherein the foam is injected into a mold formed around the root portion and allowed to cure and harden directly onto the blade surface at the trailing or leading edge.

Any manner of protective layer material may be applied over the core, such as a gel goat, to provide the core with a finished aerodynamic surface.

In one particular embodiment, the mold may be left in place on the blade such that the mold becomes a permanent component of the blade extension. Any manner of protective layer or covering may be applied over the mold.

The blade assembly may include a respective edge extension panel along both of the leading edge and trailing edge.

The present invention also encompasses various method embodiments for assembly of a root portion extension panel to at least one of a leading or trailing edge of a wind turbine blade in accordance with aspects discussed above. For example, the method may include attaching a mold to one of the leading or trailing edges (or both) adjacent to the root of the wind turbine blade, with the mold extending from adjacent the root towards a tip of the blade. A viscous material, such as a foam, is injected into the mold and allowed to cure into a hardened state that adheres directly to the respective leading or trailing edge and defines a core of the root portion extension panel. The mold may have an inner mold surface that defines an aerodynamic outer surface of the core, wherein the method includes removing the mold from the hardened core and applying any manner of suitable protective coating layer over the hardened core, such as a gel coat layer.

In another method embodiment, the mold may have an outer surface that defines an aerodynamic surface, wherein the method included leaving the mold attached to the leading and trailing edge as a permanent component of the extension panel. Any manner of suitable protective coating layer may be applied over the mold such that the mold becomes a permanent intermediate layer of the extension panel.

The present method embodiments are particularly well suited for assembly of the extension panel directly at the wind turbine site.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conventional wind turbine having one or more rotor blades that may incorporate an edge extension panel in accordance with aspects of the invention;

FIG. 2 is a perspective view of a rotor blade with a trailing edge extension panel;

FIG. 3 is a view of a wind turbine blade having leading and trailing edge extension panels after removal of the forming molds;

FIG. 4 is a view of a wind turbine blade having leading and trailing edge extension panels with the trailing edge extension panel shown in partial cut-away;

FIG. 5 is a view of a wind turbine blade having leading and trailing edge extension panels with the trailing edge extension panel shown in partial cut-away and the leading edge panel shown in a finished state;

FIG. 6 is a view of a wind turbine blade having a trailing edge extension panel shown in partial cut-away;

FIG. 7 is a view of a wind turbine blade having a leading edge extension panel shown in partial cut-away;

FIG. 8 is an end view of a blade root with leading and trailing edge extension panels, particularly illustrating the core component of the extension panels within forming molds; and FIG. 9 is an end view of a blade root with leading and trailing edge extension panels, particularly illustrating the core component and molds as permanent components of the extension panels.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, an exemplary rotor blade 16 according to aspects of the present disclosure includes exterior surfaces defining a pressure side 22 and a suction side 24 extending between a leading edge 26 and a trailing edge 28. The blade 16 extends from a blade tip 32 to a blade root 34. The exterior surfaces may be aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may further define a chord 42 and a span 44 extending in chord-wise and span-wise directions, respectively, as illustrated in FIG. 2. The chord 42 may vary throughout the span 44 of the rotor blade 16. Thus, a local chord 46 may be defined for the rotor blade 16 at any point on the rotor blade 16 along the span 44. Further, the rotor blade 16 may define a maximum chord 48, as shown.

Additionally, the rotor blade 16 may define an inner board area 52 and an outer board area 54. The inner board area 52 may be a span-wise portion of the rotor blade 16 extending from the root 34. For example, the inner board area 52 may, in some embodiments, include approximately 33%, 40%, 50%, or any other percentage of the span 44 extending from the root 34. The outer board area 54 may be a span-wise portion of the rotor blade 16 extending from the tip 32, and may in some embodiments include the remaining portion of the rotor blade 16 between the inner board area 52 and the tip 32.

Still referring to FIG. 2, a blade assembly 100 in accordance with aspects of the invention includes an edge extension panel 110 configured with the rotor blade 16. The edge extension panel 110 is a generally static component formed directly onto the exterior surface of the rotor blade 16 in the inner board area 52 of the blade. The edge extension panel 110 has an end 112 spaced from the root 34 and extends in the generally span-wise direction with a tip end 114 oriented towards the blade tip 32. The end 112 is spaced sufficiently from the root 34 t allow mounting of the blade to a flange within the blade hub 18 (FIG. 1). The edge extension panel 110 alters the contour of a portion of the inner board area 52 of the rotor blade 16 adjacent to the root 34 and, in doing so, reduces or eliminates any airflow separation region in this portion of the rotor blade 16, and further reduces the drag associated with the rotor blade 16 and increases the performance rotor blade 16.

Referring particularly to FIGS. 2 and 8, the edge extension panels 110 include a core component 116 that is formed from any manner of suitable viscous or flowable material 122 that is injected into a pre-formed mold 126 erected on the blade 16 adjacent the root portion 34. The viscous material is allowed to cure and harden within the mold 126 and defines the basic aerodynamic shape of the edge extension panels 110. The hardened, cured material 122 thus provides certain structural features to the edge extension panel 110, particularly a homogeneous core component 116 adhered directly onto the existing blade surface. The material 122 may be, for example, a resin, epoxy, or like material. In a particular embodiment, the material 122 is any one of a number of commercially available construction foams that completely fills the mold 126 and subsequently cures and hardens into a relatively light weight yet structurally strong core component 116. An inner surface 118 of the core component 116 is conformingly adhered directly onto the fiberglass surface of the blade 16. Thus, little to no air will pass between the inner surface 118 of the core component 116 and the pressure side 22, the suction side 24, and leading 26 or trailing edge 28. The outer surface 120 of the core component 116 conforms to the shape of the inner surface 128 of the mold 126. A release agent may be applied to the inner surface 128 of the mold to facilitate removal for the mold 126 from the core component 116.

Once the mold 126 has been released, any manner of protective material layer or coating 124 may be applied over the core component 116 to provide a finished, protective surface to the edge extension panels 110. For example, a gel-coat layer may be applied over the hardened foam core. Although the core component 116 is shaped by the mold 126 into a designed aerodynamic shape, the gel-coat layer may be used to further fill and refine the shape, as well as fair the edges of the edge extension panel 110 with the blade to define a generally continuous aerodynamic surface. A generally continuous aerodynamic surface is a surface that has a generally continuous aerodynamic contour.

In some embodiments, as shown in figures, the edge extension panels 110 may have a generally decreasing cross-sectional area in the span-wise direction towards the tip 32. Alternatively, however, the edge extension panels 110 may have a generally increasing cross-sectional area in the span-wise direction towards the tip 32, or may have a generally constant cross-sectional area.

Various embodiments of a blade assembly 100 with edge extension panels 110 configured therewith are illustrated in FIGS. 3 through 7. FIG. 3, for example, depicts respective edge extension panels 110 being formed on the leading edge 26 and trailing edge 28 of the blade 16 adjacent to the root portion 34. The figure depicts the molds 126 being removed from the blade 16 after the viscous material 122 injected into the molds 126 has been allowed to cure and harden into the core components 116. As mentioned with respect to FIG. 8, the molds 126 have an inner mold surface 128 that defines the general aerodynamic outer surface of the core components 116.

FIG. 4 depicts the embodiment of FIG. 3 with a protective coating 124, such as a gel-coat layer, applied to the blade edge extension 110 on the trailing edge 28. The coating 124 is shown in partial cut-away to illustrate the underlying core component 116. The same type of protective coating layer 124 will also be applied to the edge extension 110 on the leading edge 26 of the blade.

FIGS. 5 and 9 illustrate a particular embodiment of the invention wherein the molds 126 are not removed from the edge extension panel 110, but become a permanent structural feature of the edge extension panel 110. For example, referring to the trailing edge extension panel 110 shown in partial cut-away, the mold 126 remains in place over the core component 116. A protective coating layer 124, such as a gel-coat, is applied over the mold 126 to give the edge extension panel 110 its overall aerodynamic shape. This configuration is also illustrated in FIG. 9. With this embodiment, it should be appreciated that the outer surface 130 of the mold 126 is also formed in the overall general aerodynamic shape of the edge extension panel 110 so that little finishing or reshaping of the outer surface of the mold 130 is necessary prior to applying the gel-coat layer 124.

FIGS. 3 through 5 depict embodiments wherein respective edge extension panels 110 are formed on the leading 26 and trailing edge 28 of the blade 16. It should be appreciated, however, that the invention also encompasses a blade 16 wherein an edge extension panel is formed only on the trailing edge 28 (as in FIG. 6) or only the leading edge 26, as in FIG. 7.

The present invention also encompasses various method embodiments for assembly of an edge extension panel 110 onto a root portion 34 at the leading 26 or trailing edge 28 (or both edges as in FIG. 5) of the wind turbine blade 16, generally as discussed above. For example, a method in accordance with aspects of the invention may include attaching a mold 126 to either or both of the leading 26 or trailing 28 edges adjacent to the root 34 of the wind turbine blade 16, with the mold 126 extending from adjacent the root 34 towards the tip 32 of the blade. A viscous material, such as a resin, epoxy, or foam is injected into the mold. The mold 126 has an inner shape that generally defines the aerodynamic surface of the edge extension panel 110, as discussed above. Once the viscous material 122 is allowed to cure and harden within the mold 126 into a core component 116, the mold can be released from the outer surface 120 of the core 116. Any manner of suitable protective layer 124 may then be applied over the outer surface 120 to provide the edge extension panel 110 with a finished aerodynamic shape. Alternatively, as discussed above with respect to the embodiment of FIGS. 5 and 9, the mold 126 may be left in place as a permanent component of the edge extension panel 110, wherein the coating 124 is applied over the mold 126 to provide the edge extension panel 110 with its finished aerodynamic shape and surface.

The present blade assembly 100 and methods for constructing the edge extension panels 110 onto an existing wind turbine blade 16 are particularly suitable for local site construction, wherein the wind turbine blades 16 are transported to the wind turbine site and the edge extension panels 110 are formed onto the blades at the site. In this manner, the additional cost and logistical burden of transporting wind turbine blades with edge extension panels 110 that may exceed local or other jurisdictional limits on transportation of goods, as well as the capability of the truck/train beds for transporting the wind turbine blades.

It should be appreciated that the present invention is not limited to any particular shape, length, or configuration of the aerodynamic edge extension panels 110.

The present invention also encompasses any manner of a wind turbine 10 (FIG. 1) that includes a plurality of rotor blades 16 mounted to a rotor hub 18, wherein any one or combination of the blade 16 includes a blade assembly 100 as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembly of a root portion extension panel at a wind turbine site to at least one of a leading or trailing edge of a previously manufactured wind turbine blade, said method comprising:

attaching a mold to one of the leading or trailing edges adjacent to a root of the wind turbine blade, the mold extending span-wise from adjacent the root along one of the leading or trailing edges towards a tip of the wind turbine blade, the mold having a chord-wise dimension so as to extend inwardly and terminate at an intermediate position between the leading and trailing edges so as to not surround the root, the mold extending outwardly in a chord-wise direction beyond the leading or trailing edge;

injecting a viscous material into the mold;

allowing the viscous material to cure into a hardened state that adheres to the respective leading or trailing edge and defines a core of the root portion extension panel; and wherein the root portion extension panel does not surround the root portion and extends from the intermediate position outwardly to the leading or trailing edge and changes an aerodynamic chord-wise length and shape of an inner board area of the wind turbine blade adjacent the root.

2. The method as in claim 1, wherein the mold has an inner mold surface that defines an aerodynamic outer surface of the core, and further comprising removing the mold from the hardened core.

3. The method as in claim 2, further comprising applying a protective coating layer over the hardened core.

4. The method as in claim 1, wherein the mold has an outer surface that defines an aerodynamic surface, and further comprising leaving the mold attached to the leading and trailing edge as a permanent component of the extension panel.

5. The method as in claim 4, further comprising applying a coating layer over the mold such that the mold is an intermediate layer of the extension panel.

6. The method as in claim 1, comprising forming the extension panel on both of the leading and trailing edges of the blade.

7. The method as in claim 1, further comprising transporting the wind turbine blade to a wind turbine site and assembling the extension panel on the blade at the wind turbine site.

* * * * *